United States Patent [19]
Poskitt

[11] Patent Number: 5,151,979
[45] Date of Patent: Sep. 29, 1992

[54] DATA PROCESSING SYSTEM WITH INFORMATION TRANSFER BUS AND WAIT SIGNAL

[75] Inventor: Geoffrey Poskitt, Camberley, Great Britain

[73] Assignee: International Computers Limited, London, England

[21] Appl. No.: 325,785

[22] Filed: Mar. 20, 1989

[30] Foreign Application Priority Data

Apr. 9, 1988 [GB] United Kingdom ............... 8808353

[51] Int. Cl.⁵ .................. G06F 13/36; G06F 13/42
[52] U.S. Cl. ........................... 395/325; 395/550; 364/DIG. 1; 364/240.1; 364/242.92; 364/264.6; 364/271.8
[58] Field of Search ... 364/200 MS File, 900 MS File; 395/725, 325, 550

[56] References Cited

U.S. PATENT DOCUMENTS

| | | | |
|---|---|---|---|
| 4,045,782 | 8/1977 | Anderson | 364/200 |
| 4,807,109 | 2/1989 | Farrel et al. | 364/200 |
| 4,853,847 | 8/1989 | Ohuchi | 364/200 |
| 4,908,749 | 3/1990 | Marshall et al. | 364/200 |
| 4,961,140 | 10/1990 | Pechanek et al. | 364/200 |

FOREIGN PATENT DOCUMENTS 0082949 7/1983 European Pat. Off. .
0140751 5/1985 European Pat. Off. .

OTHER PUBLICATIONS

European Search Report.
Baron, "Stopping system memory and bus from putting the squeeze on fast CPUs", Electronics International, vol. 56, No. 19 (1983).
Sweazey, "Cache memory means faster access, multiple microprocessors", Electronic Design, vol. 34, No. 21 (Sep. 1986).

*Primary Examiner*—Eddie P. Chan
*Attorney, Agent, or Firm*—Lee, Mann, Smith, McWilliams, Sweeney & Ohlson

[57] ABSTRACT

A data processing system consists of a number of processing modules and memory modules interconnected by a common bus. If a memory module is not free to accept addresses or data from the bus, it asserts an address wait (AW) signal or a data wait (DW) signal, as the case may be. When a processing module sends an address or data over the bus, it normally holds it there for one clock cycle only. However, if the relevant wait signal AW or DW is asserted, the address or data is held on the bus until this wait signal is removed. This arrangement avoids the need for acknowledgement on the bus, and hence speeds up the transaction of information.

2 Claims, 3 Drawing Sheets

DATA PROCESSING SYSTEM WITH INFORMATION TRANSFER BUS AND WAIT SIGNAL

BACKGROUND TO THE INVENTION

This invention relates to data processing systems. More specifically, the invention is concerned with a data processing system comprising a plurality of units interconnected by a bus, for information transfer between the units. The units may, for example, include data processing units and memory units.

It is conventional in such a system to rely on an acknowledgement signal to indicate that information sent over the bus has been accepted by the receiving unit or units. A disadvantage of this, however, is that it means that each information transfer is essentially a two-way process : information must first propagate from the sender to the receiver, and the acknowledgement signal must then propagate back from the receiver to the sender. Thus, the minimum time for each transfer is at least twice the bus propagation delay time. This restricts the rate of information transfer over the bus.

An object of the present invention is to avoid this limitation inherent in the use of acknowledgement signals.

SUMMARY OF THE INVENTION

According to the invention there is provided data processing system comprising a plurality of units interconnected by a bus for information transfer between the units, characterised in that, whenever a unit is not free to accept information from the bus, it sends WAIT signal to the other units, and wherein when a unit sends information on the bus, it holds the information on the bus for one clock cycle only, without waiting for any acknowledgement unless a WAIT signal is present in which case it holds the information on the bus for as long as the WAIT signal is present.

It can be seen that, provided the receiving unit is free to accept the information, each transfer of information occupies just one clock beat, and this clock beat can be chosen to be equal to or not substantially greater than the time delay for one-way propagation down the bus. There is no need to wait for an acknowledgement to propagate back to the sender. When the receiving unit is not free to accept information, it will produce a WAIT signal which will delay subsequent transfers; however, as will be shown, these WAIT states can frequently be overlapped with other operations, and so do not affect the performance.

BRIEF DESCRIPTION OF THE DRAWINGS

One data processing system in accordance with the invention will now be described by way of example with reference to the accompanying drawings.

DESCRIPTION OF AN EMBODIMENT OF THE INVENTION

Figure 1:
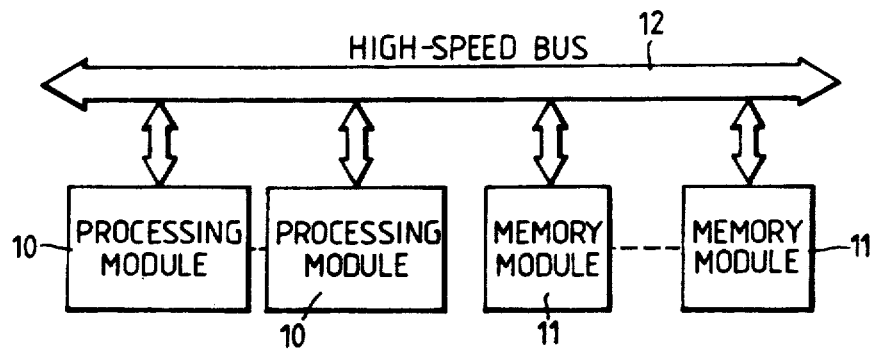
FIG. 1 is an overall block diagram of the system.

Referring to FIG. 1, the data processing system comprises a plurality of data processing modules 10, and a plurality of memory modules 11, interconnected by a high-speed bus 12.

In operation, any one of the processing modules 10, can aquire ownership of the bus for the purpose of initiating a bus transaction e.g. a read or write over the bus 12 to the memory module 11. Ownership of the bus is aquired by a bus arbitration scheme as follows.

Each of the modules has a priority dependent upon its slot position on the bus 12, the slots being arranged in decreasing order of priority from left to right as viewed in FIG. 1.

Each of the modules has a bus request output line BRQOUT and three bus request input lines BRQIN1-3. BRQIN1 is connected to BRQOUT of the module immediately to the left of the module (i.e. to the next higher priority module). Similarly, BRQIN2 and 3 are connected to BRQOUT of the modules 2 and 3 slot positions to the left. In each module, BRQOUT is asserted (i.e. driven to the voltage level representing the "true" logic state) if the module is making a request for ownership of the bus, or if any of the three input signals BRQIN1-3 is asserted.

A module wins ownership of the bus if none of the three higher priority requests BRQIN1-3 is asserted, and if the bus is not already in ownership, as indicated by a signal BOWN on a line common to all the modules. When a module wins ownership of the bus, it asserts the signal BOWN, so as to inhibit any further requests until it is ready to relinquish the bus.

Thus, it can be seen that if two or more modules simultaneously request ownership of the bus, ownership will be granted to the highest priority one of those modules. Once the bus has been aquired by a module, it may not be taken away by subseqent request from a higher priority module.

High speed bus

The high-speed bus 12 comprises the following lines.
(1) Information transfer lines AD0-31, D32-63.
During address cycles, AD0-31 carry a 32-bit memory address, while lines D32-63 are unused. During data cycles, AD0-31 and D32-63 carry a 64-bit data word, consisting of eight 8-bit bytes. Alternatively, AD0-31 can be used to carry a 32-bit data word, with D32-63 being unused.
(2) Bus qualifier lines Q0-Q7.
During address cycles, the qualifier lines carry control information indicating, for example, whether this is a read or a write transaction, and whether the data is word length is 32 or 64 bits. During data cycle, in a write transaction, the lines Q0-Q7 carry byte validity signals, to indicate which of the 8 bytes in the data word are valid and are to be written into the memory.
(3) Bus control lines:
AS (address strobe)—This is asserted by the module that currently owns the bus, when it places an address on lines AD0-31 and a qualifier on lines Q0-7.
AW (address wait)—This is asserted by the receiver of an address, if it is not currently free to accept another address. In particular, AW is asserted by a memory module if it has just accepted an address and has not yet dealt with it.

DS (data strobe)—This is asserted by a module when it places data on the lines AD0-31 and D32-63. In particular, it is asserted by a processing module when it places data on the bus in a data write transaction, and by a memory module when it places data on the bus in a data read transaction.

DW (data wait)—This is asserted by a receiver of data if it is not currently free to accept data. For example, DW is asserted by a memory module if it is not free to accept data because it is currently performing an internal refresh cycle.

(4) Miscellaneous lines:

CLK (Clock)—This carries a clock signal. The clock cycle is determined by the time required for one-way propagation of signals over the bus 12: that is, the turn-on delay of the sending unit, plus the bus propagation and setting delay, plus the set-up time for the receiving unit. Preferable, the clock cycle is substantially equal to, or not substantially greater than, this one-way propagation time. In the present example, the clock frequency is 16.67 MHz, i.e. the clock cycle is 60 nanoseconds. All bus cycles are timed from this clock. All signals are asserted on the high speed bus at the positive edge of this clock, and are clocked into receiving modules on this edge.

RST (Reset)—This is a synchronous reset signal for all the modules.

SRD (Shared)—This is used, as will be described, to allow one module to indicate that the data item currently being read by another module is shared.

IVN (Intervene)—This is used, as will be described, to allow a processing module, or the I/0 module, to indicate that it holds a more up-to-date copy of data that another module is attempting to read from the memory.

MERR (Memory Error)—This signal is asserted by a memory module when it detects an error on performing a read.

BERR (Bus error)—This is asserted if BOWN persists for more than 5 microseconds.

It should be noted that the lines AW, DW and SRD are common to all the modules, and each carries the logical OR function of signals placed on it by all the modules. In particular, AW and DW is asserted if any one of the modules has asserted it e.g. if any one of the memory modules is not free to accept an address or data.

Processing Modules

Figure 2:
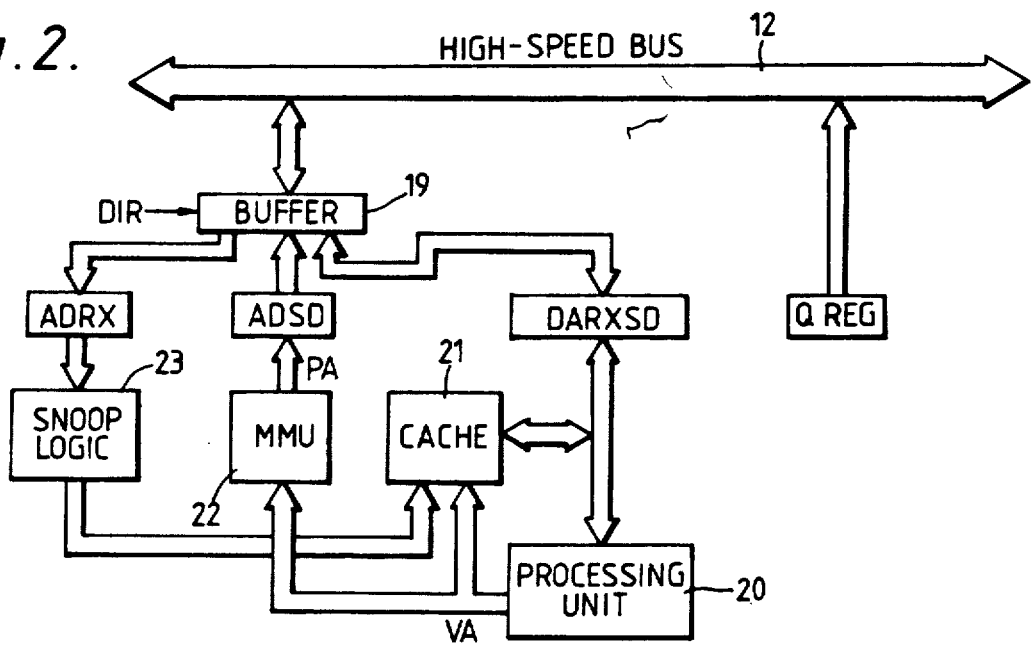
FIG. 2 shows a processing module in more detail.

Referring now to FIG. 2, this shows one of the processing modules 10 in more detail.

The module interfaces with the high-speed bus 12 by way of the following registers.

DARXSD—Data send and receive register.

This is a 64-bit register, and is connected to the bus lines AD0-31 and DA32-63.

QREG—Qualifier register.

This is an 8-bit register, connected to the bus qualifier lines Q0-Q7.

ADSD—Address sender register.

This is a 32-bit register, connected to the bus lines AD0-31.

ADRX—Address receiver register.

This is a 32-bit register, connected to the bus lines AD0-31.

The registers DARXSD, ADSD and ADRX are connected to the respective bus lines by way of a two-way buffer register 19.

The processing module includes a data processing unit 20, which may be a known 32-bit microprocessor.

The processing module also contains a cache 21. This is a relatively small, fast-access store, compared with the main memory (the memory modules 11) and holds data copied from the main memory, for rapid access by the processing unit 20. The cache is a set-associative cache, and is addressed by a virtual address VA from the processing unit 20. The cache contains 4K lines of data, each line holding 32 bytes (i.e. four 64-bit words).

Each line of the cache has status bits, defining one of four states as follows:

INVALID
SHARED NON-DIRTY
EXCLUSIVE NON-DIRTY
EXCLUSIVE DIRTY.

"SHARED" means that the line of data is also present in the cache of at least one other module, while "EXCLUSIVE" means that the line is not present in any other cache.

"DIRTY" means that this line has been written to since being copied from the main memory, while "NON-DIRTY" means that the line has not been written to.

The processing module 10 also includes a memory management unit (MMU) 22, which translates the virtual address VA into a physical address PA, which can then be applied to the bus 12 by way of the register ADSD, so as to address the main memory.

When the processing unit 20 requires to access data for reading or writing, it applies the virtual address VA of the data to the cache 21, so as to access the corresponding line of data in the cache. If the required data is present in the cache line, a hit is scored; otherwise a miss is scored. The action of the cache is as follows.

Read hit : in this case, the data can be accessed immediately from the cache. The status of the cache line is not changed.

Read miss : in this case, the required data must be fetched from the mainstore, and loaded into the cache, overwriting the existing line of the cache. If the existing line is in the EXCLUSIVE DIRTY state, it must first be copied back to the main memory, so as to ensure that the most up-to-date copy of the data is preserved. This is achieved by means of a block write transaction over the high speed bus. The required data is then fetched from the main memory, by means of a block read transaction over the high speed bus, and loaded into the cache. The status of the new block is set either to SHARED NON-DIRTY or EXCLUSIVE NON-DIRTY, according to whether or not this line is already present in the cache of another processing module, as indicated by the SRD line.

Write hit : if the current status of the cache line is EXCLUSIVE NON-DIRTY, the data is written into the cache, and the status is set to EXCLUSIVE DIRTY. If the status is already EXCLUSIVE DIRTY, the write proceeds without delay and there is no state change. If the cache line status is SHARED NON-DIRTY, then the physical address on the line is broadcast over the bus to the other processing modules, so that they can invalidate the corresponding line in their caches, to ensure cache coherency. This is referred to as a broadcast invalidate operation. The data is written into the cache and the cache line status set to EXCLUSIVE DIRTY.

Write miss : in this case, the cache follows the sequence for read miss described above, followed by the sequence for write hit.

Each processing module 10 includes a snoop logic unit 23, whose purpose is to ensure coherency between the contents of the cache 21 and the caches in the other processing modules. The snoop logic unit 23 is an associative memory which stores as tags the physical addresses of all the data currently resident in the cache 21. The snoop logic receives all the physical addresses appearing on the high speed bus from the other processing modules, by way of the register ADRX, and compares each received address with the stored physical address tags. If the received address matches any of the stored physical addresses, the snoop logic generates the corresponding virtual address, and applies it to the cache 21 so as to access the corresponding line of data.

The operation of the snoop logic unit 23 is as follows. If the snoop logic detects a match during a broadcast invalidate operation by another processing module, it sets the status of the addressed cache line to INVALID. This ensures cache coherency.

If the snoop logic detects a match during a block read transaction by another processing module, it asserts DW and AW so as to temporarily freeze the read transaction. It then checks the status of the data line in the cache 21. When it has ascertained the status, it de-asserts DW and Aw, to allow the read transaction to continue. At the same time, if the status is SHARED NON-DIRTY or EXCLUSIVE NON-DIRTY, the snoop logic asserts the SRD line so as to inform the other processing module that the data in question is also present in the cache in this processing module. The cache line status is set to SHARED NON-DIRTY. If, on the other hand, the status of the cache line is EXCLUSIVE DIRTY, the snoop logic initiates an INTERVENTION operation, to be described in more detail below. This causes the block read transaction to be temporarily suspended, while the data line is copied back to the main store. The cache line status is changed to SHARED NON-DIRTY. The block read transaction is then allowed to continue. This ensures that the other processing module reads the most up-to-date copy of the data.

Bus control logic

Figure 3:
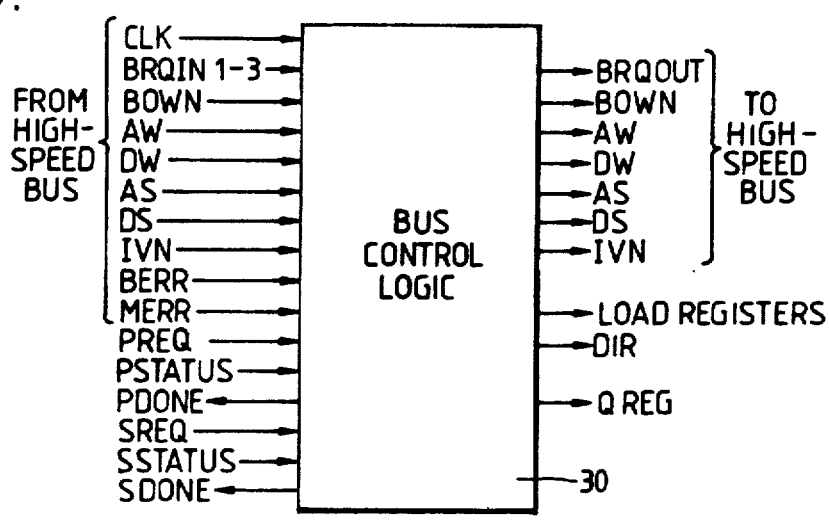
FIG. 3 shows bus control logic forming part of the processing module.

Referring now to FIG. 3, each processing module also includes bus control logic 30, which controls the transactions over the high speed bus 12.

As shown, the bus control logic 30 receives the signals CLK, BRQIN1-3, BOWN, AW, DW, AS, DS, IVN, SRD, BERR and MERR from the high-speed bus. The control logic 30 also generates load signals for the registers ADSD, ADRX, DARXSD and QREG, and a direction control signal DIR for the buffer 19, to control whether that buffer is sending or receiving data on the address and data lines. The control logic also generates the input signals for QREG.

The control logic 30 also receives signals PREQ and PSTATUS from the associated processing unit 20. PREQ indicates that the processing unit requires the control logic to initiate an action, such as for example a block read transaction. PSTATUS indicates the nature of the required action When the control logic 30 has completed the requested action, it returns a signal PDONE to the processing unit.

Similarly, the control logic 30 receives signals SREQ and SSTATUS from the snoop logic 23. SREQ indicates that the snoop logic requires the control logic to initiate an action, such as an INTERVENTION operation. SSTATUS indicates the nature of the required action. When the control logic has completed the requested action, it returns a signal SDONE to the snoop logic.

The bus control logic 30 comprises a state machine, having a number of internal states. Transitions between these states are governed by the values of the input signals, and the output signals are determined by the current state. The operation of the bus control logic is as follows.

Block read

A block read transaction reads a block of four data words D0-D3 from the main memory, over the high-speed bus. The block is used to refill a line of the cache 21.

Figure 4:
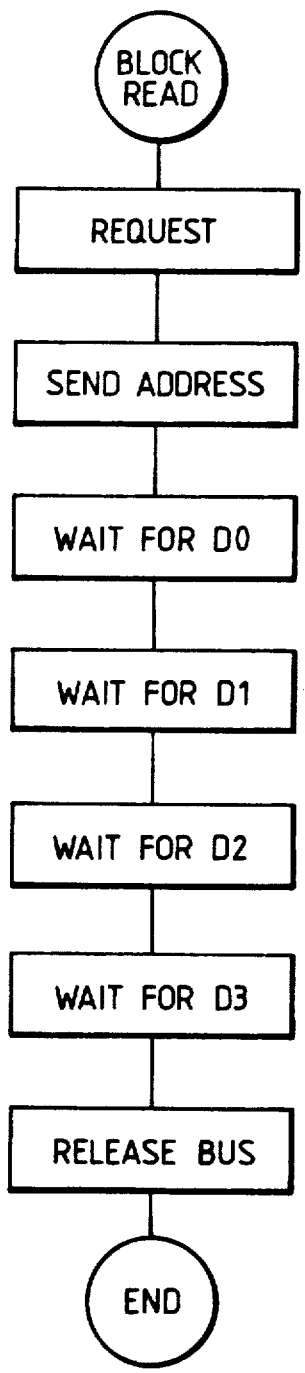
FIGS. 4, 5 and 6 are flow charts showing the operation of the bus control logic.

Referring to FIG. 4, this shows the sequence of states of the bus control logic 30 for a block read transaction. The action in each state is as follows.

(1) REQUEST. In this state, the control logic loads the physical address PA from the MMU 22 into the ADSD register, and loads control bits specifying the transaction type into QREG. At the same time, it asserts BRQOUT, requesting ownership of the high-speed bus.

At each beat of CLK, the following condition is tested:

BRQIN1+BRQIN2+BRQIN3+BOWN.

While this condition is true, the control logic remains in the REQUEST state. When the condition becomes false, the control logic goes on to its next state.

Thus, it can be seen that the control logic remains in the REQUEST state until there are no requests from any higher priority modules, and the bus is not owned by any other module.

(2) SEND ADDRESS. The bus has now been won, and so the control logic de-asserts BRQOUT and asserts BOWN. At the same time it switches the buffer register 19 to its send condition, so as to place the contents of the register ADSD on to the address lines AD0-31. The contents of QREG are sent on Q0-7. The address strobe signal AS is asserted.

At each clock beat, the condition of the address wait line AW is tested. While AW is true, the control logic remains in this state. If AW is false, the control logic goes on to its next state.

Thus, the address is held on the bus until any address wait AW from another module has been withdrawn.

(3) WAIT FOR D0. The address has now been sent, and so the address strobe AS is de-asserted. At the same time, the buffer 19 is switched to its receive condition, so as to remove the address from the bus and to allow the voltage of the address lines to float. Similarly, QREQ is switched to allow the qualifier lines Q0-7 to float.

The state of the SRD line is tested. If the snoop logic in any other module has found a match with the address sent over the bus, it will have asserted SRD as described above, to indicate that the data block is shared with at least one other module. Thus, if the control logic finds that SRD is true, it sets the status of the currently addressed line of the cache 21 (which will receive the data) to SHARED NON-DIRTY. Otherwise, if SRD is not asserted, the cache line status is set to EXCLUSIVE NON-DIRTY.

At the same time, the condition $DS.\overline{DW}.\overline{IVN}$ is monitored. If this condition is true, a 64-bit data word is loaded into the data register DARXSD from the bus lines AD0–31 and D32–63. This is the first data word D0 of the four-word block.

At each beat of clock CLK, the following condition is tested:

BERR $+DS.\overline{DW}.\overline{IVN}$

Whilst this condition is false, the control logic remains in this state. When the condition becomes true, the controller goes on to the next state.

Thus, the controller remains in this state until either a data strobe DS is received, without DW or IVN being asserted, or a bus error is detected.

(4)–(6) WAIT FOR D1–D3. The next three states are similar to the WAIT FOR D0 state, except that the SRD line is not tested in these states, and the cache line status is not changed.

(7) RELEASE BUS. The transaction is now finished, and so BOWN is de-asserted to release the bus. If BERR or MERR was asserted, the processing unit will perform an error-handling action.

Block write

A block write transaction writes a block of four data words D0–D3 from the processing module to the main memory, over the high speed bus. This is used to copy data back from the cache 21 to the main memory before it is overwritten in the cache.

Figure 5:
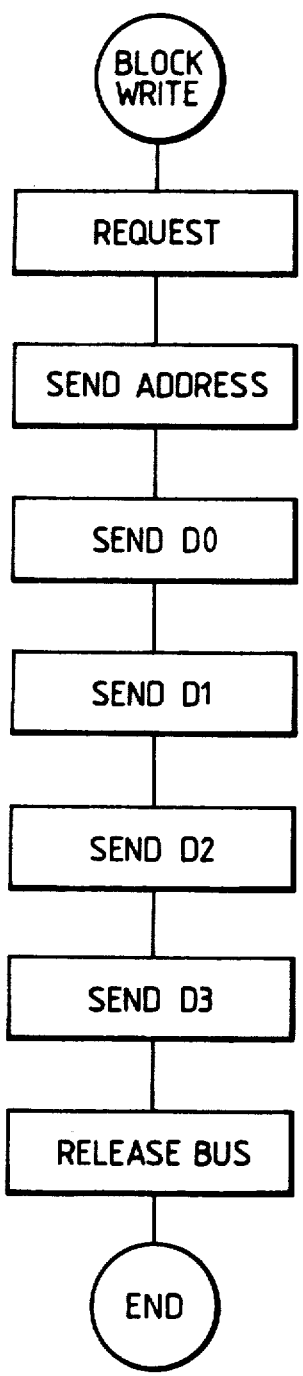
Figure 6:
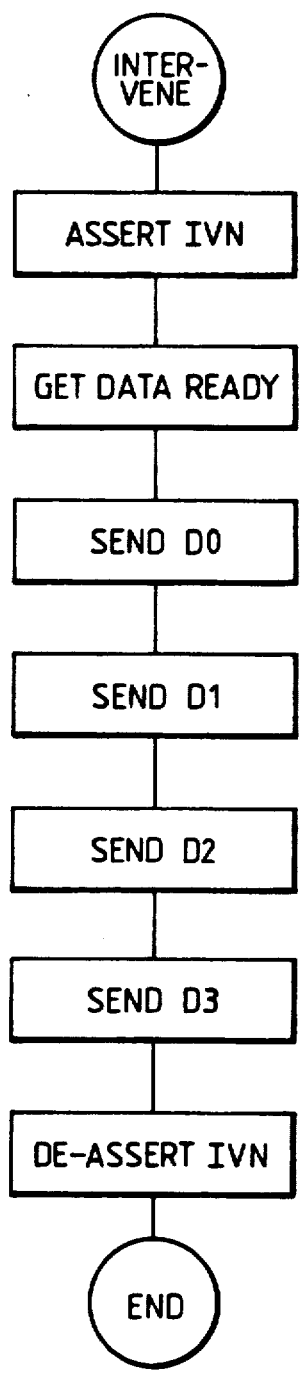

Referring to FIG. 5, this is a flow chart showing the sequence of states of the bus control logic 30 for a block write transaction. The action in each state is as follows.

(1) REQUEST. This is the same as for the block read transaction.

(2) SEND ADDRESS. This is the same as for the block read transaction, except that in this case the first data word D0 is loaded from the cache into the data register DARXSD to get it ready to send, and QREG is loaded with the required validity bits for the data.

(3) SEND D0. The control logic de-asserts AS and asserts DS. At the same time, the buffer 19 is set to its send condition, so as to place the first data word on the bus lines AD0–31, D32–63. The contents of QREG are sent on Q0–7. The next data word D1 is then loaded into the data register DARXSD to get it ready to send, while the first word D0 is still in the buffer 19.

At each clock beat, DW is tested. If DW is true, the control logic remains in this state, If DW is false, it goes on to the next state.

Thus it can be seen that the first data word D0 is placed on the bus with a data strobe. If the data wait DW is asserted, the data is held there until DW is removed.

(4)–(6) SEND D1–D3. These states are similar to the SEND D0 state, and cause the second to fourth words of the block to be sent.

(7) RELEASE BUS. The transaction is now complete, and so BOWN is de-asserted to release the bus, and DS is de-asserted. At the same time, the buffer 19 is switched to its receive condition, so as to remove the data from the bus, allowing the lines AD0–31, D32–63 to float. Similarly, QREG is switched to allow Q0–7 to float.

INTERVENTION

When the snoop logic in one module detects that another processor is attempting to read a stale (i.e. out-of-date) block of data from the main memory, it instructs the control logic 30 to perform an INTERVENTION action as follows.

(1) ASSERT IVN. In this state, IVN is asserted. The effect of this is to temporarily suspend the block read transaction of the other processor. At the next clock beat, the control logic goes on to the next state.

(2) GET DATA READY. The first word D0 of the up-to-date data is loaded from the cache into the data register DARXSD, and the corresponding validity bits are set in QREG. However, the data is not placed on the bus yet; the control logic waits an extra cycle to give the memory module that was addressed by the block read transaction time to get off the bus. At the next clock beat, the control logic goes on to the next state.

(3)–(6) SEND D0–D3. These states are similar to those in the block write transaction. This causes the up-to-date data block to be written into the currently addressed location of the main memory.

(7) DE-ASSERT IVN. Finally, the intervention signal IVN is de-asserted, the DS line is de-asserted, and the bus lines AD0–31, D32–63 and Q0–7 are allowed to float. This allows the interrupted block read transaction to continue. The transaction will now read the up-to-date value of the data from the main memory.

EXAMPLES OF OPERATION

Figure 7:
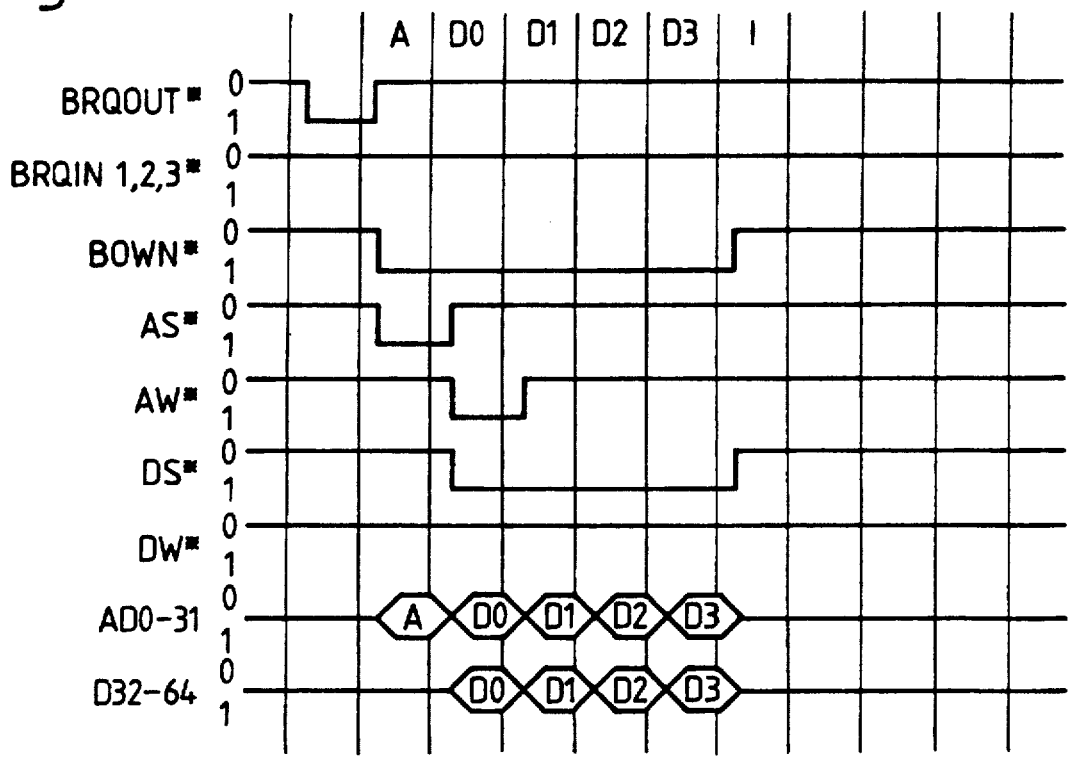
FIGS. 7 and 8 are timing diagrams illustrating an example of operation of the system.

Referring now to FIG. 7, this is a timing diagram showing a normal block write transaction.

(1) In the first clock period, BRQOUT is asserted by a processing module to request bus ownership.

(2) In the second clock period, the bus has been won by the requesting module, and BOWN is asserted. AS is asserted so as to strobe the address on the bus. This address is received by the memory modules into their own address receiver registers.

(3) Each memory module now asserts AW for one clock period, while it is handling the received address. At the same time, the processing module places the first data word D0 on the bus and asserts DS.

(4)–(6). In the next three clock periods, the other three data words are placed on the bus.

(7). Finally, the processing module de-asserts BOWN and DS, to terminate the transaction.

It should be noted that, although the address wait AW is asserted for one clock period, this does not in fact cause any hold-up in this case, since the address wait is overlapped with the data, and is de-asserted before the next address would be sent over the bus.

Figure 8:
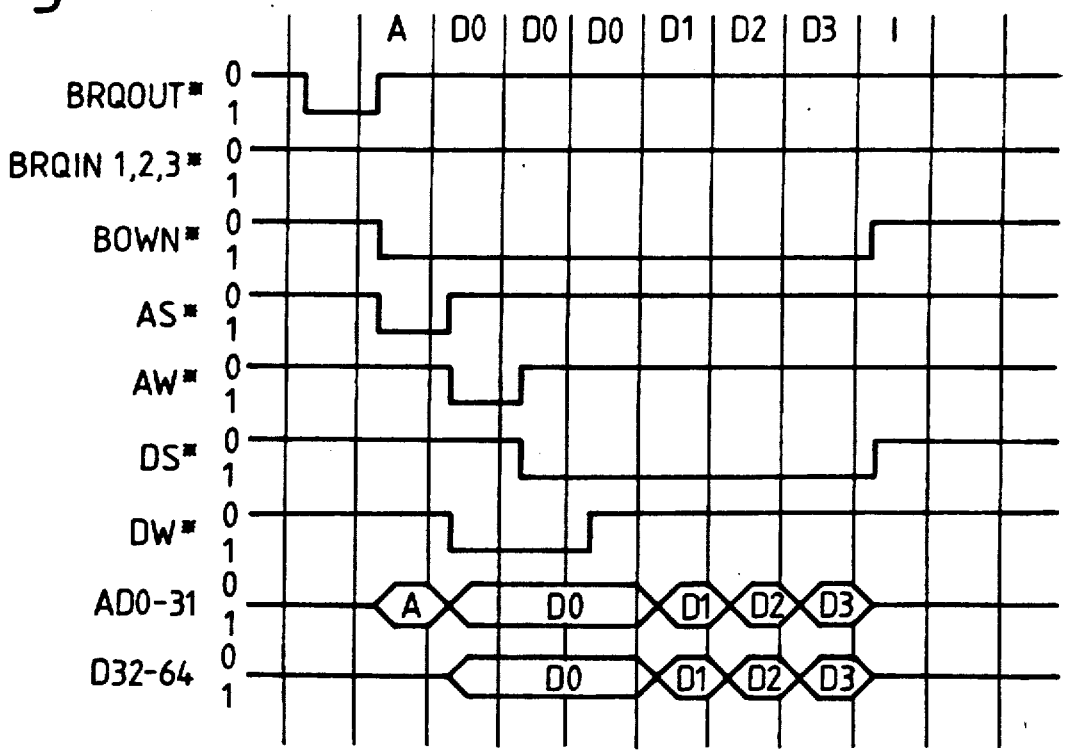

FIG. 8 also shows a block write transaction. However, in this case, it is assumed that the addressed memory module is busy, performing an internal refresh cycle, and is thus not able to accept the data. This memory module therefore asserts DW. This causes the processing module that initiated the block write to hold the first data word D0 on the bus.

When the memory module is ready to accept the data it de-asserts DW. As a result the processing module is able to remove the first data word D0 at the end of the clock period, and to place the other three data words on the bus in the next three clock periods.

I claim:

1. A data processing system comprising:
   (a) a plurality of functional units,
   (b) a bus interconnecting the functional units to allow transfer of addresses and data between the functional units, and (c) an ADDRESS WAIT signal path and a DATA WAIT signal path interconnecting the functional units,
(d) wherein at least a first one of the functional units comprises means for asserting an ADDRESS WAIT signal on said ADDRESS WAIT signal path whenever that functional unit is unable to accept an address from the bus, and for asserting a DATA WAIT signal on said DATA WAIT signal path whenever that functional unit is unable to accept data from the bus,
(e) wherein at least a second one of the functional units comprises means for placing an address on the bus for one clock cycle, means responsive to absence of the ADDRESS WAIT signal during said one clock cycle for withdrawing said address from the bus at the end of said clock cycle, means responsive to assertion of the ADDRESS WAIT signal for holding the address on the bus for as long as the ADDRESS WAIT signal is asserted, means for placing data on the bus for a single clock cycle, means responsive to absence of the DATA WAIT signal during said single clock cycle for withdrawing said data from the bus at the end of said single clock cycle, and means responsive to assertion of the DATA WAIT signal for holding the data on the bus for as long as the DATA WAIT signal is asserted,
(f) and wherein each said clock cycle is substantially equal to the time required for one-way propagation of information over said bus between said second one of the functional units and said first one of the functional units.

2. A system according to claim 1, wherein said first one of the functional units is a memory and said second one of the functional units is a data processing unit.

* * * * *